United States Patent
Huang et al.

(10) Patent No.: US 7,474,082 B2
(45) Date of Patent: Jan. 6, 2009

(54) VOLTAGE CONVERTING APPARATUS WITH AUTO-ADJUSTING BOOST MULTIPLE

(75) Inventors: Yi-Pin Huang, Taichung County (TW); Feng-Jung Kuo, Taipei County (TW); Jen-Hao Hsueh, Taichung (TW); Wen-Ping Chou, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 282 days.

(21) Appl. No.: 11/550,418

(22) Filed: Oct. 18, 2006

(65) Prior Publication Data

US 2008/0036433 A1 Feb. 14, 2008

(30) Foreign Application Priority Data

Aug. 14, 2006 (TW) .............................. 95129747 A

(51) Int. Cl.
*G05F 1/563* (2006.01)
(52) U.S. Cl. .......................... 323/266; 323/222; 363/60
(58) Field of Classification Search ................. 323/222, 323/224, 266; 363/59, 60, 65
See application file for complete search history.

(56) References Cited

U.S. PATENT DOCUMENTS

| | | | |
|---|---|---|---|
| 6,137,280 A * | 10/2000 | Ackermann et al. | 323/354 |
| 6,798,177 B1 * | 9/2004 | Liu et al. | 323/222 |
| 7,071,660 B2 * | 7/2006 | Xu et al. | 323/266 |
| 7,392,405 B2 * | 6/2008 | Nachamiev et al. | 713/300 |

* cited by examiner

*Primary Examiner*—Jeffrey L Sterrett
(74) *Attorney, Agent, or Firm*—Jianq Chyun IP Office

(57) ABSTRACT

This present invention relates to a voltage converting apparatus with auto-adjusting boost-multiple, which includes a microprocessor unit, a boost multiple control unit, a boost unit, and a voltage converting unit. According to the digital signal, the microprocessor unit generates an output voltage information and a converting multiple information. According to the output voltage information, the boost multiple control unit computes the corresponding relation between an output voltage and an input voltage in order to generate the boost multiple information. Based on the boost multiple information, the boost unit can amplify the output voltage to generate an converting operation voltage. The voltage converting unit operates between the converting operation voltage and a fist voltage, and converts a reference voltage into the output voltage according to the converting multiple information.

10 Claims, 3 Drawing Sheets

VOLTAGE CONVERTING APPARATUS WITH AUTO-ADJUSTING BOOST MULTIPLE

CROSS-REFERENCE TO RELATED APPLICATION

This application claims the priority benefit of Taiwan application serial no. 95129747, filed Aug. 14, 2006. All disclosure of the Taiwan application is incorporated herein by reference.

BACKGROUND OF THE INVENTION

1. Field of the Invention

The present invention relates to a voltage converting apparatus. More particularly, the present invention relates to a voltage converting apparatus with auto-adjusting boost multiple.

2. Description of Related Art

The voltage converting apparatus is a necessary interface circuit between circuits with different operating voltages. For example, the voltage converting apparatus is one of the important components for the thin film transistor liquid crystal display (TFT LCD). Because each of the function blocks in the TFT LCD operates in different operation voltage, the TFT LCD must utilize the voltage converting apparatus to generate the operation voltage required by each of function blocks, for example, the function blocks include the gate driver, source driver and timing controller.

FIG. 1 is an architecture diagram of the conventional voltage converting apparatus. As shown in FIG. 3, the conventional voltage converting apparatus 100 converts the input voltage VIN to the output voltage Vout1 according to the digital signal SD1. In the process of converting the input voltage VIN to the output voltage Vout1, a conventional microprocessor unit 101, fist according to the digital signal SD1, produces the converting multiple information ST1 for amplifying the output voltage $Vout_1$. The conventional boost unit 130 produces the converting operation voltage VTP1 through a fixed boost multiple. Therefore, conventional voltage converting unit 140 is operated between the converting operation voltage VTP1 and a ground voltage. According to the converting multiple information ST1, the conventional voltage converting unit 140 amplifies the reference voltage Vref1, which is produced by the conventional reference voltage generating unit 120, and converts it to the output voltage Vout1.

For example, when the single operation voltage of TFT LCD is 2.4V, and the operation voltages of the function blocks are individually 8V, 6.5V, and 4V, the converting operation voltage VPT1 generated by the conventional boost unit 130 must be larger than 8V. For example, through four times of the boost multiple, the conventional boost unit 130 produces the converting operation voltage VPT1 which is 9.6V. In this way, according to the converting multiple information ST1, the conventional voltage converting unit 140 can produce the output voltages VOUT1, which are 8V, 6.5V, and 4V.

However, because the conventional boost unit 130 produces the converting operation voltage VPT1 only through the fixed boost multiple, the conventional voltage converting unit 140 must be operated in the 9.6V converting operation voltage VPT1 even though the conventional voltage converting unit 140 only needs to produce the 4V output voltage $V_{OUT1}$. In other words, the conventional voltage converting apparatus 100 not only lacks flexible application but also has greater power consumption.

SUMMARY OF THE INVENTION

An objective of the present invention is to provide the voltage converting apparatus with an auto-adjusting boost multiple, which automatically switches the boost multiple through a boost multiple control unit so that the voltage converting apparatus can efficiently reduce power consumption.

In order to achieve the above-mentioned or other objectives, the present invention provides a voltage converting apparatus with an auto-adjusting boost multiple, used for adjusting an input voltage into an output voltage according to a digital signal. This voltage converting apparatus includes the microprocessor unit, the boost multiple control unit, the boost unit and the voltage converting unit. According to the digital signal, the microprocessor unit generates an output voltage information and a converting multiple information. According to the output voltage information, the boost multiple control unit computes the corresponding relation between the output voltage and the input voltage in order to generate the boost multiple information. In this way, according to boost multiple information, the boost unit can amplify the output voltage to generate the converting operation voltage. The voltage converting unit operates between the converting operation voltage and the fist voltage to convert the reference voltage into the output voltage according to the converting multiple information.

In an embodiment of the present invention, the voltage converting apparatus further includes a reference voltage generator, which is used to generate the reference voltage. When the microprocessor unit generates the reference voltage information according to the digital signal, this reference voltage generator can adjust the reference voltage according to the reference voltage information.

In an embodiment of the present invention, the above-mentioned voltage converting unit includes an operational amplifier, a first variable impedance circuit, and a second variable impedance circuit. According to the impedance value of the first variable impedance circuit and the second variable impedance circuit, the operational amplifier can convert the reference voltage into the output voltage. The impedance values provided by the first variable impedance circuit and the second variable impedance circuit are determined by the converting multiple information.

Using a boost multiple control unit, the present invention automatically generates the boost multiple information used for converting the input voltage. In this way, when the voltage converting unit generates the different output voltage according to the converting multiple information, the voltage converting unit can be bias in the different converting operation voltages. Therefore, the voltage converting apparatus can efficiently decrease the power consumption.

In order to make the aforementioned and other objectives, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
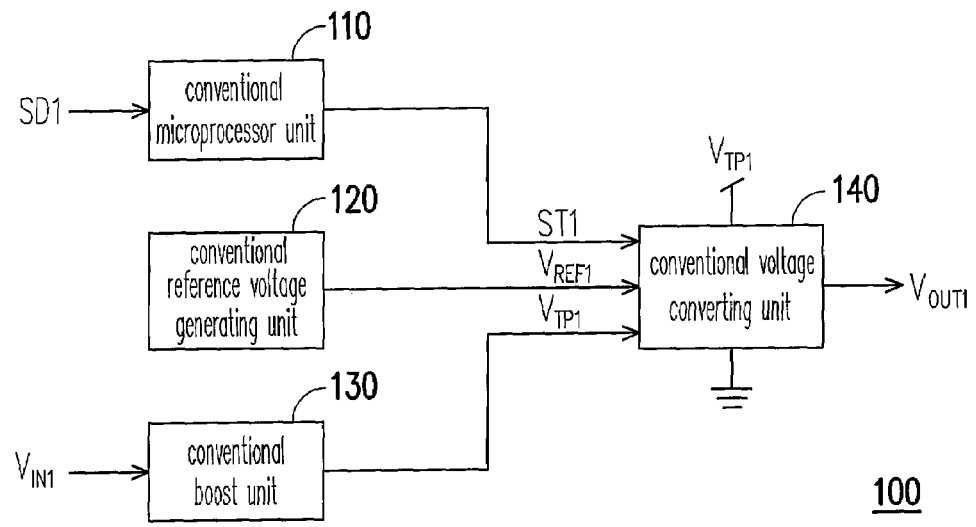
FIG. 1 is a schematic cross-sectional view of a conventional voltage converting apparatus.

Reference will now be made in detail to the present preferred embodiments of the invention, examples of which are illustrated in the accompanying drawings. Wherever possible, the same reference numbers are used in the drawings and the description to refer to the same or like parts.

The technical feature of the present invention is using the boost multiple control unit to achieve the efficiency of auto-switching the boost multiple. In this way, the voltage converting apparatus will efficiently decrease the power consumption. However, the description is not intended to limit the present invention. Those skilled in the art can make appropriate modifications to the following embodiments without departing from the spirit of the present invention, and the modifications still fall in the scope of the present invention.

Figure 2:
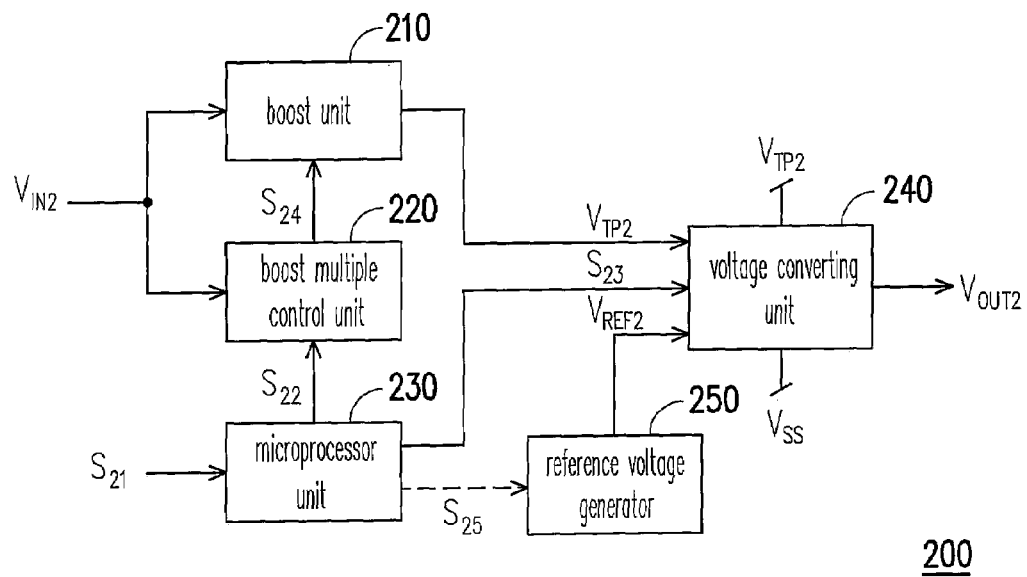
FIG. 2 is a schematic cross-sectional view of a voltage converting apparatus with an auto-adjusting boost multiple according to an embodiment of the present invention.

According to an embodiment of the present invention, FIG. 2 is a schematic cross-sectional view of a voltage converting apparatus with an auto-adjusting boost multiple. Referring to FIG. 2, the voltage converting apparatus 200 includes a boost unit 210, a boost multiple control unit 220, a microprocessor unit 230 and a voltage converting unit 240. Wherein, the boost multiple control unit 220 is coupled to the microprocessor unit 230. The boost unit 210 is coupled to the boost multiple control unit 220. The voltage converting unit 240 is coupled to the microprocessor unit 230 and the boost unit 210.

Referring to FIG. 2, the voltage converting apparatus 200 converts the input voltage $V_{IN2}$ into the output voltage $V_{OUT2}$ according to the digital signal $S_{21}$. In the process of converting the input voltage $V_{IN2}$ into the output voltage $V_{OUT2}$, the microprocessor unit 230, first according to the digital signal $S_{21}$, generates the output voltage information $S_{22}$ and the converting multiple information $S_{23}$. Therefore, according to the output voltage information $S_{22}$, boost multiple control unit 220 can obtain that what kind of output voltage $V_{OUT2}$ is necessarily to be generated by the voltage converting unit 240 at the moment. And under the situation of accepting the input voltage $V_{IN2}$, the boost multiple control unit 220 will generate the boost multiple information $S_{24}$ through computing the corresponding relation between the output voltage $V_{OUT2}$ and the input voltage $V_{IN2}$.

In this way, according to the boost multiple information $S_{24}$, the boost unit 210 can amplify the input voltage $V_{IN2}$ to generate the converting operation voltage $V_{TP2}$. The voltage converting unit 240 is operated between the converting operation voltage $V_{TP2}$ and the fist voltage to convert the reference voltage $V_{REF2}$ into the output voltage $V_{OUT2}$ according to the converting multiple information $S_{23}$. Wherein, the first voltage is ground voltage $V_{SS}$.

Take the voltage converting apparatus 200, which is applied to the TFTLCD, for example. If the single operation voltage of the TFTLCD is 2.4 V and the operation voltages of the function blocks in the TFTLCD are respectively 8V, 6.5V, and 4V, the voltage converting apparatus 200 must adjust the input voltage $V_{IN2}$ (the single operation voltage of TFTLCD), which is 2.4 V, to the output voltage $V_{OUT2}$ (the operation voltages of the function blocks), which are 8V, 6.5V, and 4V.

According to the foresaid example, if the 2.4V input voltage $V_{IN2}$ needs converting to the 4V output voltage $V_{OUT2}$, the boost multiple control unit 220, according to the output voltage $V_{OUT2}$, will obtain the information that the input voltage $V_{OUT2}$ must be 4V. On the other hand, through computing the corresponding relation between the output voltage $V_{OUT2}$ and the input voltage $V_{IN2}$, the boost multiple control unit 220 generates the boost multiple information When the corresponding relation between the output voltage $V_{OUT2}$ and the input voltage $V_{IN2}$ is the ratio between them, that is to say, when the corresponding relation is (4/2.4), the boost multiple information $S_{24}$ will be attached with the message that the boost multiple is (4/2.4). Therefore, according to the boost multiple information $S_{24}$, the boost unit 210 can obtain the message that the boost multiple is (4/2.4). In this way, the input voltage $V_{IN2}$ received by the boost unit 210 can be converted to 2.4*(4/2.4)=4V and outputted as the operation voltage $V_{TP2}$.

In other words, compared to the conventional art, the conventional voltage converting unit 140 must be operated under the operation voltage, which is 9.6V, to generate the output voltage VOUT1, which is 4V. On the contrary, the voltage converting unit 240 of this present invention can generate the 4V output voltage $V_{OUT2}$ only under the condition of 4V operation voltage.

Referring to FIG. 2, the voltage converting apparatus 200 includes the reference voltage generator 250. The reference voltage 250 is coupled to voltage converting unit 240 to generate the reference voltage $V_{REF2}$. On the other hand, in the process of the voltage converting unit 240 converting the reference voltage $V_{REF2}$ into the output voltage $V_{OUT2}$, the microprocessor unit 230 can be used to adjust the reference voltage $V_{REF2}$ produced by the reference generator 250 so as to promote the converting efficiency of voltage converting unit 240. In the process of adjusting the reference voltage $V_{REF2}$, the microprocessor unit 230 generates the reference voltage information $S_{25}$ according to the digital signal $S_{21}$. And according to the reference voltage information $S_{25}$, the reference voltage generator 250 will adjust the reference voltage $V_{REF2}$ that will be outputted.

It should be noted that although a possible configuration mode of the reference voltage generator 250 has been described in the embodiment of the FIG. 2, those who are aware of this technical art should know that the reference voltage generator 250 can be included in the voltage converting unit 240. In other words, the reference voltage generator conforms to the spirit of the present invention as long as it can provide a reference voltage $V_{REF2}$ to the voltage converting unit 240.

Figure 3:
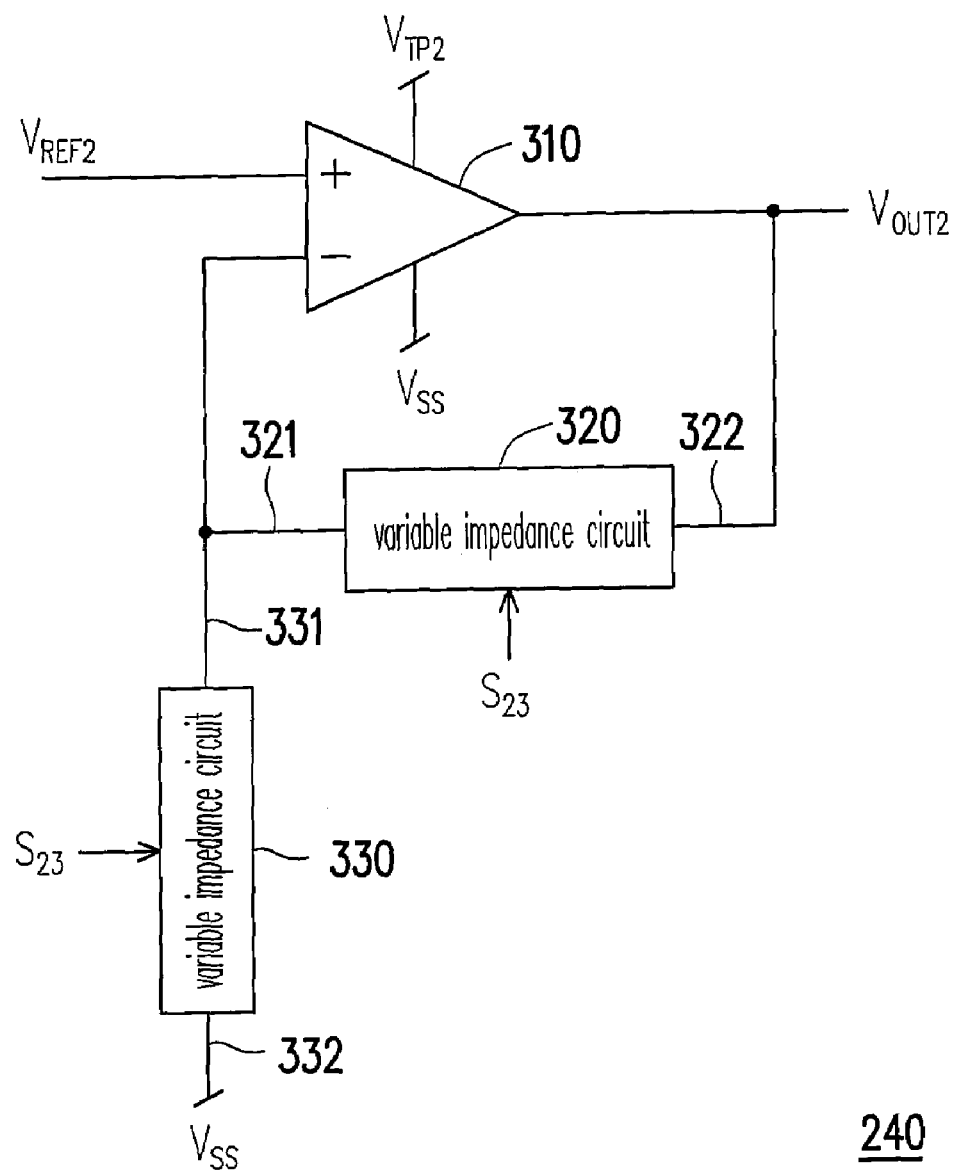
FIG. 3 is a schematic cross-sectional view of the voltage converting unit according to an embodiment of the present invention.

According to an embodiment of the present invention, FIG. 3 is a schematic cross-sectional view of the voltage converting unit. Referring to the FIG. 3, the voltage converting unit 240 includes the operational amplifier 310, and the variable impedance circuits 320 and 330. The variable impedance circuit 320 has a first connecting terminal 321 and a second connecting terminal 322. The first connecting terminal 321 is coupled to the second input terminal of the operational amplifier 310. The second connecting terminal 322 is coupled to the output terminal of the amplifier 310. Similarly, the variable impedance circuit 330 has a third connecting terminal 331 and the forth connecting terminal 332. The third connecting terminal 331 is coupled to the second input terminal of the amplifier 310. The forth connecting terminal 332 is coupled to the first voltage (such as the ground voltage $V_{SS}$).

Referring to the FIG. 3, the operational amplifier 310 is operated between the converting operation voltage $V_{TP2}$ and the first voltage (such as the ground voltage $V_{SS}$). And according to the impedance of the variable impedance circuits 320 and 330, the operational amplifier 310 can convert the reference voltage $V_{REF2}$ into the output voltage $V_{OUT2}$. In this way, according to the converting multiple information $S_{23}$, the variable impedance circuit 320 can determine the impedance between the first connecting terminal 321 and the second connecting terminal 322. And according to the converting multiple information $S_{23}$, the variable impedance circuit 330 can determine the impedance between the third connecting terminal 331 and the forth connecting terminal 332.

Figure 4A:
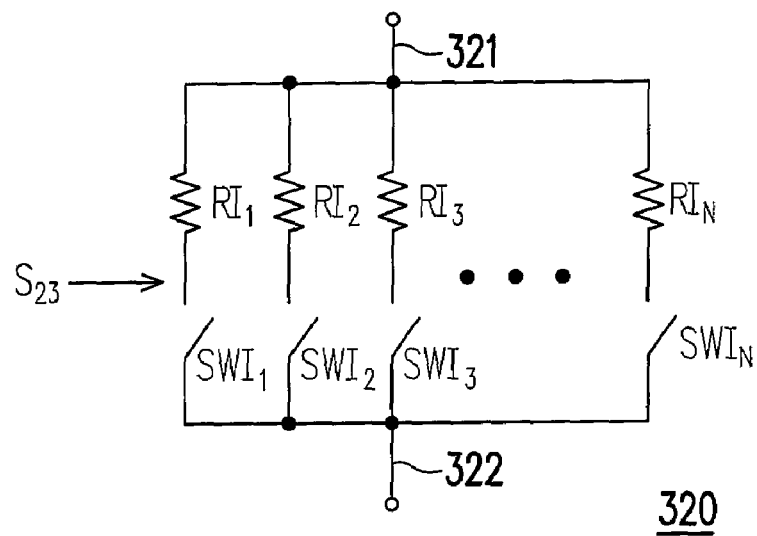
FIGS. 4A and 4B are the detailed circuit diagrams of the changeable resist circuits according to an embodiment of the present invention.
Figure 4B:
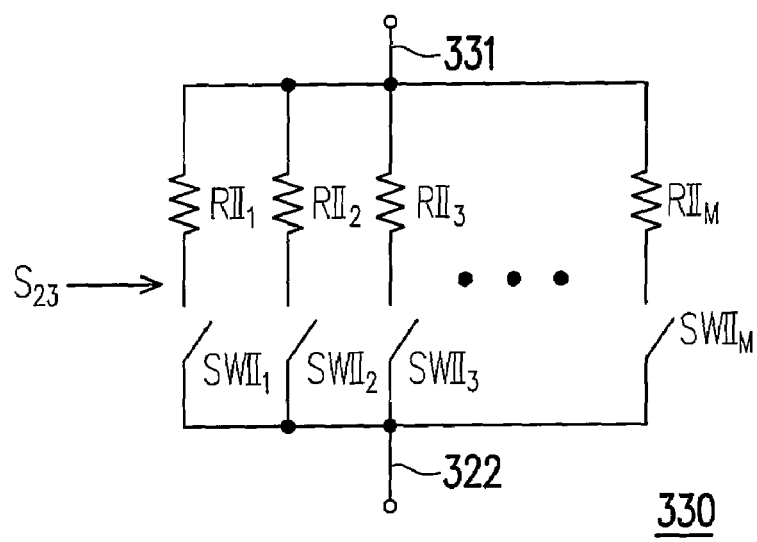

According to an embodiment of the present invention, FIGS. 4A and 4B are detailed circuit diagrams of the variable impedance circuit. Referring to the FIGS. 4A and 4B, the variable impedance circuit 320 includes the resistors $RI_1 \sim RI_N$ and the switches $SWI_1 \sim SWI_N$, in which N is an integer larger than 0. The first terminals of the resistors $RI_1 \sim RI_N$ are coupled to the first connecting terminal 321. The first terminals of the switches $SWI_1 \sim SWI_N$ are individually coupled to the second terminals of the resistors $RI_1 \sim RI_N$. For example, the first terminal of the switch $SWI_1$ is coupled to the second terminal of the resistor $RI_1$, and the first terminal of the switch $SWI_2$ is coupled to the second terminal of the resistor $RI_2$. The second terminals of the switches $SWI_1 \sim SWI_N$ are coupled to the second connecting terminal 322.

Similarly, the variable impedance circuit 330 includes the resistors $RII_1 \sim RII_M$ and the switches $SWII_1 \sim SWII_M$, in which M is an integer larger than 0. The first terminals of the resistor $RI_1 \sim RI_N$ are coupled to the third connecting terminal 331. The first terminals of the switches $SWII_1 \sim SWII_M$ are individually coupled to the second terminals of the resistors $RII_1 \sim RII_M$. For example, the first terminal of the switch $SWII_1$ is coupled to the second terminal of the resistor $RII_1$, and the first terminal of the switch $SWII_2$ is coupled to the second terminal of the resistor $RII_2$. The second terminals of the switches $SWII_1 \sim SWII_M$ are coupled to the forth connecting terminal 332.

Referring to the FIGS. 4A and 4B, the switches $SWI_1 \sim SWI_N$ of the variable impedance circuit 320, according to the converting multiple information $S_{23}$ determine the conductive state between the first terminal and the second terminal thereof. Accordingly, the number of the parallel resistors between the first connecting terminal 321 and the second connecting terminal 322 will be changed with the converting multiple information $S_{23}$. In other words, according to the converting multiple information $S_{23}$, the variable impedance circuit 320 will determine the impedance between the first connecting terminal 321 and the second connecting terminal 322. Similarly, the switches $SWII_1 \sim SWII_M$ of the variable impedance circuit 330, according to the converting multiple information $S_{23}$, determine the conductive state between the first terminal and the second terminal thereof. In this way, according to the converting multiple information $S_{23}$, the variable impedance circuit 330 will determine the impedance between the third connecting terminal 331 and the fourth connecting terminal 332.

To sum up, this present invention uses the boost multiple control unit to automatically switch the converting operation voltage produced from boost unit. In this way, when the voltage converting unit generates the different output voltage according to the converting multiple information, the voltage converting unit can be biased in different converting operation voltages. In other words, compared to the conventional art, this present invention of the voltage converting apparatus will efficiently decrease the power consumption.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A voltage converting apparatus with auto-adjusting boost multiple, used for adjusting an input voltage to an output voltage according to a digital signal, the voltage converting apparatus comprising:
    a microprocessor unit, used for generating an output voltage information and a converting multiple information according to the digital signal;
    a boost multiple control unit, coupled to the microprocessor unit, and according to the output voltage information, computing the corresponding relation between the output voltage and the input voltage in order to generate an boost multiple information;
    a boost unit, coupled to the boost multiple control unit and used for amplifying the input voltage in order to generate a converting operation voltage according to the boost multiple information; and
    a voltage converting unit, coupled to the microprocessor unit and the boost unit, wherein the voltage converting unit is operated between the converting operation voltage and a first voltage, and used for converting an reference voltage into the output voltage according to the converting multiple information.

2. The voltage converting apparatus with auto-adjusting boost multiple as claimed in claim 1, wherein the voltage converting unit comprises:
    a reference voltage generator, used for generating the reference voltage.

3. The voltage converting apparatus with auto-adjusting boost multiple as claimed in claim 2, wherein the microprocessor generates a reference voltage information according to the digital signal, and the reference voltage generator adjusts the reference voltage according to the reference voltage information.

4. The voltage converting apparatus with auto-adjusting boost multiple as claimed in claim 1 further comprises:
    a reference voltage generator, used for generating the reference voltage.

5. The voltage converting apparatus with auto-adjusting boost multiple as claimed in claim 4, wherein the microprocessor generates a reference voltage information according to the digital signal, and the reference voltage generator adjusts the reference voltage according to the reference voltage information.

6. The voltage converting apparatus with auto-adjusting boost multiple as claimed in claim 1, wherein the voltage converting unit comprises:
    an operational amplifier, with a first input terminal used for receiving the reference voltage;
    a first variable impedance circuit, with a first connecting terminal and a second connecting terminal, wherein the first connecting terminal is coupled to the second input terminal of the operational amplifier, and the second connecting terminal is coupled to the output terminal of the operational amplifier, the first variable impedance circuit determines the impedance between the first connecting terminal and the second connecting terminal according to the converting multiple information; and
    a second variable impedance circuit, with a third connecting terminal and a fourth connecting terminal, wherein the third connecting terminal is coupled to the second input terminal of the operational amplifier, and the fourth connecting terminal is coupled to the first voltage, the second variable impedance circuit determines the impedance between the third connecting terminal and the fourth connecting terminal according to the converting multiple information.

7. The voltage converting apparatus with auto-adjusting boost multiple as claimed in claim 6, wherein the first variable impedance circuit comprises:
   a plurality of first resistors, wherein the first terminals of the first resistors are coupled to the first connecting terminal; and
   a plurality of first switches, wherein the first terminals of the first switches are individually coupled to the second terminals of the first resistors, the second terminals of the first switches are coupled to the second connecting terminal, the first switches determine the conductive state between the first terminal and the second terminal thereof according to the converting multiple information.

8. The voltage converting apparatus with auto-adjusting boost multiple as claimed in claim 6, wherein the second variable impedance circuit comprises:
   a plurality of second resistors, wherein the first terminals of the second resistors are coupled to the third connecting terminal; and
   a plurality of second switches, wherein the first terminals of the second switches are individually coupled to the second terminals of the second resistors, the second terminals of the second switches are coupled to the fourth connecting terminal, the second switches determine the conductive state between the first terminal and the second terminal thereof according to the converting multiple information.

9. The voltage converting apparatus with auto-adjusting boost multiple as claimed in claim 1, wherein the first voltage is a ground voltage.

10. The voltage converting apparatus with auto-adjusting boost multiple as claimed in claim 1, suitable for the thin film transistor liquid crystal display.

* * * * *